United States Patent [19]
Ehrmann et al.

[11] 4,447,064
[45] May 8, 1984

[54] RADIAL SHAFT SEALING RING HAVING A SEALING LIP AND LIQUID DEFLECTORS

[75] Inventors: Peter Ehrmann, Hemsbach; Dieter Fuchs, Riedstadt OT-Crumstadt; Karl-Heinrich Spies, Birkenau, all of Fed. Rep. of Germany

[73] Assignee: Firma Carl Freudenberg, Weinheim, Fed. Rep. of Germany

[21] Appl. No.: 405,728

[22] Filed: Aug. 6, 1982

[30] Foreign Application Priority Data

Dec. 2, 1981 [DE] Fed. Rep. of Germany ....... 3147625

[51] Int. Cl.³ .............................................. F16J 15/32
[52] U.S. Cl. ..................................... 277/134; 277/153
[58] Field of Search ............... 277/152, 153, 164, 133, 277/134

[56] References Cited

U.S. PATENT DOCUMENTS 3,744,805 7/1973 Heinrich .............................. 277/133
4,350,347 9/1982 Heinrich ............................. 277/134

Primary Examiner—Robert I. Smith
Attorney, Agent, or Firm—Kenyon & Kenyon

[57] ABSTRACT

A radial shaft sealing ring is disclosed which comprises a lip ring having a sealing lip which is resiliently pressed against the shaft to be sealed. The lip ring has a conical inner surface which surrounds the shaft and faces the liquid to be sealed off. A plurality of liquid deflectors are associated with the lip ring on the side of the sealing lip facing the sealed off liquid. The liquid deflectors are spaced apart around the circumferential periphery of the shaft. The liquid deflector have a leading surface which is essentially parallel to the axis of the shaft and which is inclined or curved forward toward the direction of shaft rotation. The inner edge of the liquid deflectors is a knife-edge like wiper which merges into the inclined or curved leading surface and which is spaced from the peripheral surface of the shaft. The ratio of the distance that the inner wiper edge extends substantially parallel to the axial direction of the shaft to the distance adjacent wiper inner edges are spaced apart around the circumferential periphery of the shaft is about 4.0 to 50.

19 Claims, 3 Drawing Figures

RADIAL SHAFT SEALING RING HAVING A SEALING LIP AND LIQUID DEFLECTORS

FIELD OF THE INVENTION

This invention relates to radial shaft sealing rings. More particularly, this invention relates to a radial shaft-sealing ring having a sealing lip pressed against the sealed shaft, and which has associated therewith liquid deflectors on the side of the sealing lip facing the sealed-off liquid.

BACKGROUND OF THE INVENTION

A prior art radial shaft-sealing ring of this general type is disclosed in DE-OS 1 916 214. The liquid deflectors of this prior art sealing ring are designed movable like fins and they rest with their inside circumference on the surface of the sealed shaft. Therefore, during rotation of the shaft, they are deflected in the direction of rotation. Thus, these prior art fins serve as scrapers and their purpose is to strip foreign bodies and liquids off the surface of the shaft and to throw them off and outward. This results in lubricating oil no longer reaching the sealing zone proper at high shaft rotation speeds. In this extremely temperature-sensitive region, lack of lubrication can occur which results in a further increase of the heat generated by friction and thus in premature failure of the sealing element. For this reason, the prior art radial shaft-sealing rings of the type described cannot be used for sealing high-speed shafts.

Liquid deflectors inhibit the accumulation or incrustation of solid materials in the region of the sealing zone. This accumulation can occur on the inner surface of the lip ring or on the shaft itself. Accumulations on the lip ring can result in the impairment of the flexibility and the elasticity of the sealing lip with the accompanying detrimental effects on the seal if shaft vibrations occur. Accumulations on the surface on the shaft leads to an increased diameter of the shaft or irregular distributions resulting in relief-like fissure formations on the shaft surface. This can result in heavy wear and rapid destruction of the sealing lip if there is an axial shift of the shaft in the sealing zone.

OBJECT OF THE INVENTION

It is therefore an object of the present invention to provide a radial shaft sealing ring having liquid deflectors which is reliable and effective at high shaft rotational speeds.

It is a further object of the present invention to provide a radial shaft sealing ring having liquid deflectors which is reliable and effective at shaft rotational speeds of up to about 8000 r.p.m.

It is yet another object of the present invention to provide a radial shaft sealing ring having liquid deflectors which effectively prevents the accumulation or incrustation of solids in the region of the sealing zone.

It is still a further object of the present invention to provide a radial shaft sealing ring which permits effective cooling of the lubricant in the region of the seal.

These and other objects will becomes apparent from the following description and claims in conjunction with the drawing.

SUMMARY OF THE INVENTION

The present invention may be generally summarized as a radial shaft sealing ring for sealing off a liquid comprising:

a lip ring surrounding said shaft wherein the inner surface of said lip ring facing said sealed off liquid has a conical shape;

a sealing lip fabricated from an elastomer material depending from said lip ring toward said shaft and surrounding said shaft wherein the side of said sealing lip facing said sealed off liquid merges into said conical shaped surface;

means for resiliently pressing said sealing lip against said shaft;

a plurality of liquid deflectors of planar design associated with said lip ring and spaced from said sealing lip on the side of said sealing lip facing said sealed off liquid; wherein, said liquid deflectors are spaced apart around the circumferential periphery of said shaft;

said liquid deflectors having a leading surface facing the direction of rotation of said shaft and extending a distance essentially parallel to the axial direction of said shaft;

said leading surfaces are inclined forward toward the direction of rotation of said shaft;

said liquid deflectors have an inner edge adjacent said shaft with said inner edge being a knife edge-like wiper which merges uniformly into said leading surface;

said wiper inner edges are spaced from said shaft throughout; and wherein, the ratio of the distance said wiper inner edges extend essentially parallel to the axial direction of said shaft to the distance adjacent wiper inner edges are spaced apart around the circumferential periphery of said shaft is about 4.0 to 50.

BRIEF DESCRIPTION OF THE DRAWINGS

In the drawing forming part hereof.

DESCRIPTION OF THE PREFERRED EMBODIMENT

Figure 1:
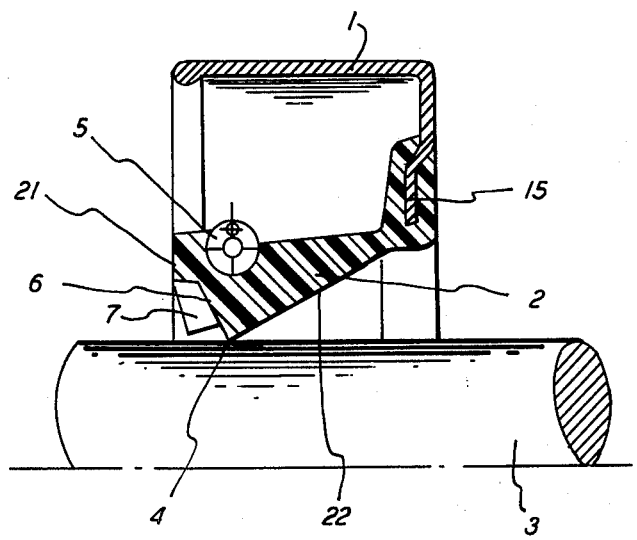
FIG. 1 is a schematic half sectional view of a radial shaft sealing ring in accordance with one embodiment of the present invention.

In order to afford a complete understanding of the present invention and an appreciation of its advantages, a description of the preferred embodiments is presented below.

With the radial shaft-sealing ring, in accordance with the present invention, the oil film on the surface of the sealed shaft is not wiped off but rather it is peeled-off down to a small residual film of defined thickness. The remaining residual oil film ensures reliable lubrication and cooling of the sealing zone proper at even very high shaft speeds. The residual oil film is renewed continuously by the oil being replenished on the surface of the shaft. Optimum results are obtained if a curved leading surface 9 (FIG. 2) is provided for the liquid deflector of the radial shaft sealing ring of the present invention. The outermost layers of the inflowing oil film are peeled off by the successive wiper edges of the individual liquid deflectors which penetrate like knife edges into the oil film rotating with the rotating shaft. Depending on the number of the liquid deflectors distributed around the circumference of the shaft, only a small volume of the total volume of oil to be peeled off is peeled off by each of the individual wiper edges during every shaft revolution. This facilitates ensuring that a constant, small thickness residual oil film remains on the shaft. At the same time, the actual volume of peeled-off oil is large enough to cause intensive mixing with the residual oil film deflected at the sealing edge of the radial shaft seal and thereby causes spontaneous cooling thereof.

In the region of the conical surface of the sealing element, as well as on the surface of the sealed shaft, substantially no accumulation or incrustations of solid material occurs, even after extended use, probably because of these foregoing reasons.

According to one advantageous embodiment of the present invention, the wiper edges are constructed to enclose an acute angle with the surface and the axial extent of the shaft. To accomplish this, a leading surface of the liquid deflectors 7 may assume the shape of a triangle and the oil to be peeled off is essentially collected by the tip closest to the shaft which is facing the sealed-off medium (See FIG. 1). Especially good results are obtained if the wiper edges enclose an angle of 4° to 28° with the surface and/or with the axial extension of the shaft.

In accordance with the present invention, the wiper edges of the liquid deflectors should approach the surface of the sealed-off shaft at least at one point so as to provide a very small gap. Preferably, the distance that the wiper edges are spaced from the surface of the shaft at this very small gap is in the range of 0.1 to 0.4 mm. In no case must the wiper edges touch the shaft. The spacing of the liquid deflector wiper edges from the shaft is guided by the sealing lip 4 which rests on the surface of the shaft. For this reason, the originally set distance is reliably maintained even in the event of a radial shift of the shaft. That is, if the shaft shifts in the radial direction, the sealing lip which is pressed against the shaft will also shift. The liquid deflectors are mounted to shift responsive to the shifting of the sealing lip thereby maintaining the distance that the wiper edges are spaced from the surface of the shaft.

The liquid deflectors 7 are arranged spaced apart around the circumferential periphery of the shaft. Suitably the spacing is uniform. (See, e.g., FIG. 2.) According to one advantageous embodiment of the present invention, the ratio of the distance that the wiper edges 8 extend essentially parallel to the axial direction of the shaft to the distance adjacent wiper edges 8 are spaced apart around the circumferential periphery of the shaft is suitably about 4.0 to 6. Especially with shaft diameters between 10 and 100 mm, excellent results were obtained when these ranges were observed.

The liquid deflectors 7 may be spaced a distance from the conical surface 6 of the radial shaft-sealing ring in the direction toward the sealed off medium. The spacing can only be very small, for instance 0.1–0.6 mm. By observing such a distance, an equalization of the oil flow pattern is produced in the entire circumferential region.

The liquid-deflectors can also abut directly against the conical surface 6 of the lip ring. In this embodiment, an intensification of the mixing between the components of the oil film separated from the shaft in the axial direction in successive stages is achieved. Particularly for rapid cooling of the last-separated components, such intensified mixing is of great advantage.

It is not absolutely necessary to form the liquid-deflectors 7 directly from the conical surface 6 of the lip ring of the radial shaft-sealing ring. Such a design provides great advantages from the manufacturing view point and it is suggested if precise information regarding the necessary detailed design of the radial shaft sealing ring of the present invention is available prior to manufacture. Depending on the viscosity of different oil grades and/or temperatures, however, variations may become necessary which may make it advantageous to provide the liquid deflectors as projections 11, 12 of a holding ring 10 which is linked to the sealing lip 4 of the radial shaft sealing ring (See FIG. 3). The mounting of the holding ring 10 can be accomplished, for instance, in a key groove of the lip ring 2.

To obtain an effectiveness which is independent of the direction of rotation of the sealed shaft, it has been found to be advantageous if a liquid deflector has leading surfaces on the forward side and the back side. In such a design, only the front side of the liquid deflectors is acted upon during counterclockwise shaft rotation, and only the backside during clockwise shaft rotation. Each of these two sides is designed according to the features of the present invention and associated with the surface of the sealed-off shaft.

The conical surface 6 of the lip ring of radial shaft-sealing ring may merge into a cylindrical surface 21 as one proceeds in the direction toward the sealed off liquid (see FIG. 1) whereby an axial return of the peeled-off particles into the sealed-off space is favored. A particularly advantageous pickup of these peeled-off components by the leading surfaces 9 is obtained if they have a forward curvature (see FIG. 2) in the region of the inside circumference approximately parallel to the surface of the sealed-off shaft 3. The liquid-deflectors 11, 12 can also be arranged in rows succeeding each other in the axial direction (see FIG. 3). Optionally, the circumferentially spaced apart liquid deflectors in a first row are arranged to be intermediate circumferentially spaced apart successive liquid deflectors in a second row. That is, the circumferential location of the liquid deflectors 11, 12 in adjacent rows may be said to be staggered. In the zones between a cross flow in the circumferential direction can develop in this embodiment which contributes to the equalization of the flow pattern, with reference to the entire circumference.

The radial shaft-sealing ring, in accordance with the embodiment of the present invention illustrated in FIG. 1, comprises a stiffening ring 1 fabricated, for example, from sheet steel which has an annular profile. The stiffening ring may have a radially inwardly directed annular support member 15 to which a lip ring 2, fabricated from an elastomer or rubber-elastic material, is fastened, for example, by vulcanizing. The lip ring 2 has a sealing lip 4 which may be formed by two intersecting conical surfaces 6, 22. The sealing lip 4 has sharp edges and is resiliently pressed by the force of a helical ring spring 5 positioned in a slot in the sealing lip 2 against the surface of the sealed-off shaft 3 with elastic pre-tension.

The conical surface 6 of the lip ring 2 facing the medium to be sealed off changes into a cylindrical surface 21 in the region of the outer circumference. Between this region and the conical surface 6, liquid-deflectors 7 are arranged uniformly distributed over the circumference of the shaft 3, which are of planar shape, and which may be integrally formed out of the material of the lip ring 2.

Figure 2:
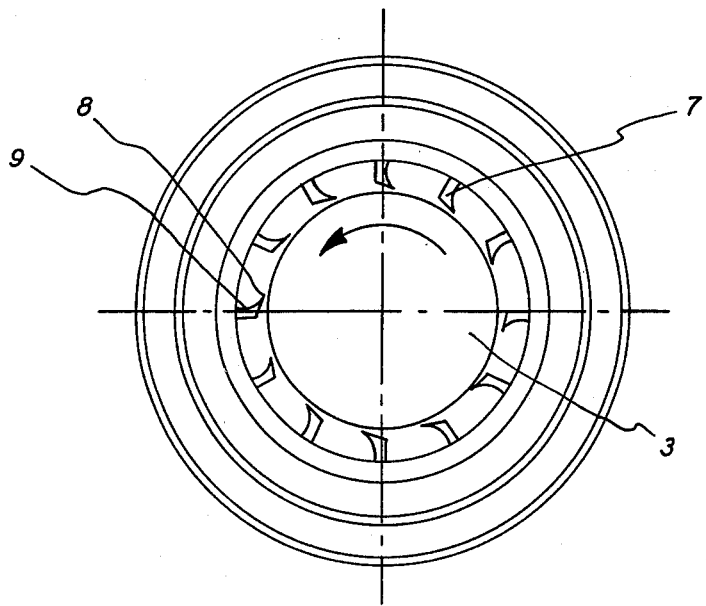
FIG. 2 is a schematic front view of the embodiment of the radial shaft sealing ring illustrated in FIG. 1.

FIG. 2 illustrates the design of the liquid-deflectors. They are bounded on the inside by wiper edges 8 of knife edge-like design which merge uniformly into the leading surface 9 and have a forward curvature with respect to the direction (arrow) of the rotation of shaft 3. The liquid-deflectors 7 throughout are spaced a distance from the shaft 3 and the ratio of the axial extent to the mutual spacing of adjacent wiper edges is approximately, for example, 4.6.

Figure 3:
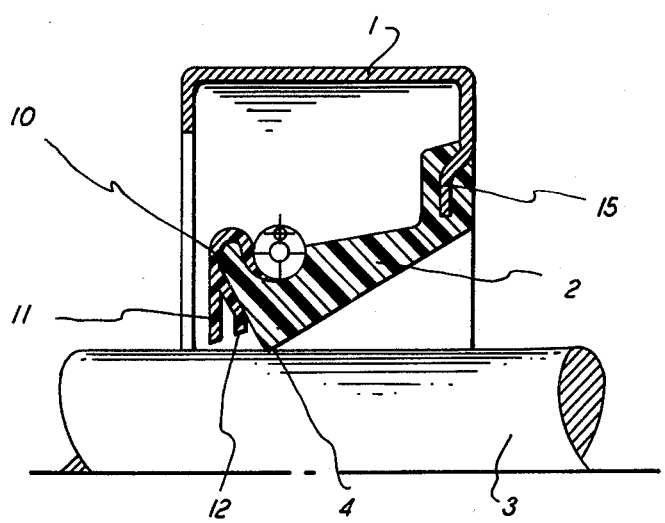
FIG. 3 is a schematic half sectional view of a radial shaft ring in accordance with another embodiment of the present invention.

In the embodiment of the present invention illustrated in FIG. 3, the liquid-deflectors 11, 12 are not formed directly out of the material of the lip ring 2, but are part of a holding ring 10 fabricated, for example, from a thermoplastic material. The holding ring 10 is anchored in the spring groove of the lip ring 2 and has projecting from its inside circumference two rows of liquid-deflectors 11, 12 which are arranged one behind the other in the axial direction.

Although preferred embodiments of the present invention have been described in detail, it is contemplated that modifications may be made within the spirit and scope of the invention.

What is claimed is:

1. A radial shaft sealing ring for sealing off a liquid comprising:
   a lip ring surrounding said shaft wherein the inner surface of said lip ring facing said sealed off liquid has a conical shape;
   a sealing lip fabricated from an elastomer material depending from said lip ring toward said shaft and surrounding said shaft wherein the side of said sealing lip facing said sealed off liquid merges into said conical shaped surface;
   means for resiliently pressing said sealing lip against said shaft;
   a plurality of liquid deflectors of planar design associated with said lip ring and spaced from said sealing lip on the side of said sealing lip facing said sealed off liquid;
   said liquid deflectors being spaced apart around the circumferential periphery of said shaft;
   said liquid deflectors having a leading surface facing the direction of rotation of said shaft and extending a distance essentially parallel to the axial direction of said shaft;
   said leading surfaces being inclined against the direction of rotation of said shaft;
   said liquid deflectors having an inner edge adjacent said shaft with said inner edge being a knife edge-like wiper which merges uniformly into said inclined leading surface; and
   said wiper inner edges being spaced from said shaft throughout.

2. A radial shaft sealing ring as recited in claim 1 wherein said leading surfaces are curved forward toward the direction of rotation of said shaft.

3. A radial shaft sealing ring as recited in claim 1 wherein said wiper inner edges enclose an acute angle with the circumferential surface of said shaft.

4. A radial shaft sealing ring as recited in claims 1 or 3 wherein said wiper inner edges enclose an acute angle with the axis of said shaft in the direction away from the sealed off liquid.

5. A radial shaft sealing ring as recited in claim 3 wherein said acute angle is in the range of about 4.0° to 28°.

6. A radial shaft sealing ring as recited in claim 4 wherein said acute angle is in the range of about 4° to 28°.

7. A radial shaft sealing ring as recited in claim 1 wherein the smallest distance said wiper inner edge is spaced from the surface of said shaft is about 0.1 mm to 0.4 mm.

8. A radial shaft sealing ring as recited in claim 1 wherein said liquid deflectors are spaced from said conical shaped surface of said lip ring in the axial direction toward said sealed off liquid.

9. A radial shaft sealing ring as recited in claim 1 wherein said liquid deflectors abut against said conical shaped surface of said lip ring.

10. A radial shaft sealing ring as recited in claims 1, 8 or 9 wherein said liquid deflectors are projections of a holding ring which is mounted by means responsive to movement of said sealing lip pressed against said shaft.

11. A radial shaft sealing ring as recited in claim 1 wherein said lip ring inner conical shaped surface merges into a cylindrical shaped inner surface in the direction toward the sealed off liquid.

12. A radial shaft sealing ring as recited in claims 1, 8, 9 or 11 wherein said liquid deflectors are formed integrally out of said lip ring.

13. A radial shaft sealing ring as recited in claim 1 wherein said liquid deflectors have another leading surface and wiper inner edge facing the other direction of shaft rotation.

14. A radial shaft sealing ring as recited in claim 1 wherein said leading surfaces are inclined forward in the region of the inner edges approximately parallel to the circumferential direction.

15. A radial shaft sealing ring as recited in claim 14 wherein said leading surfaces are curved forward in the region of the inner edges approximately parallel to the circumferential direction.

16. A radial shaft sealing ring as recited in claim 1 wherein more than one row of liquid deflectors are arranged one behind the other in the axial direction.

17. A radial shaft sealing ring as recited in claim 16 wherein the circumferentially spaced apart successive liquid deflectors in a first row are arranged to be located intermediate the circumferentially spaced apart successive liquid deflectors in a second row.

18. A radial shaft sealing ring as recited in claims 1 or 2 wherein the ratio of the distance said wiper inner edges extend essentially parallel to the axial direction of said shaft to the distance adjacent wiper inner edges are spaced apart around the circumferential periphery of said shaft is about 4.0 to 50.

19. A radial shaft sealing ring as recited in claim 18 wherein said ratio is 4.0.

* * * * *